Aug. 11, 1959  J. C. FISHER  2,898,858
LIQUID PUMP

Filed March 20, 1957  2 Sheets-Sheet 1

INVENTOR
JOHN C. FISHER
BY
KENWAY, JENNEY, WITTER & HILDRETH

ATTORNEYS

Aug. 11, 1959     J. C. FISHER     2,898,858
LIQUID PUMP
Filed March 20, 1957     2 Sheets-Sheet 2
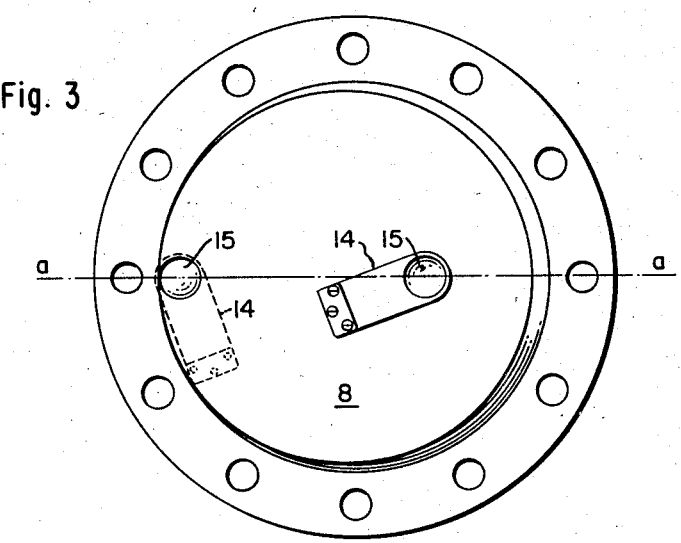
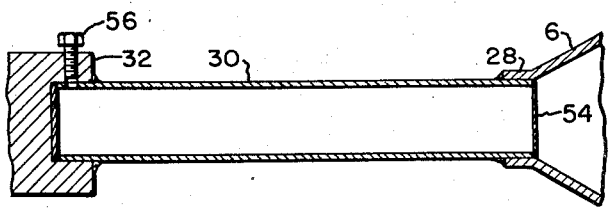
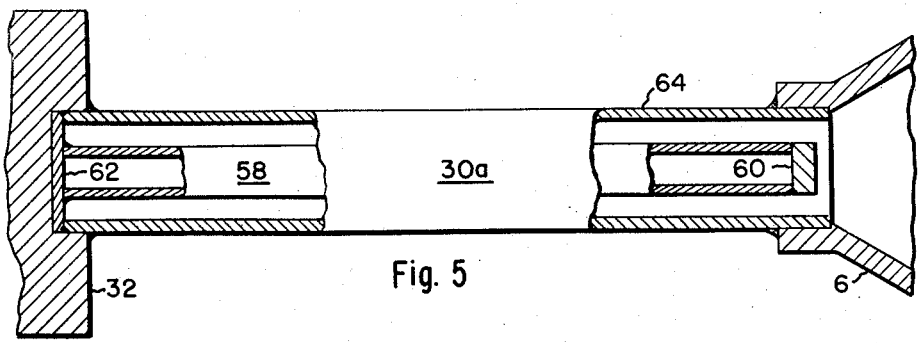
INVENTOR
JOHN C. FISHER
BY
KENWAY, JENNEY, WITTER & HILDRETH
ATTORNEYS United States Patent Office 2,898,858
Patented Aug. 11, 1959

2,898,858

LIQUID PUMP

John C. Fisher, Cambridge, Mass.

Application March 20, 1957, Serial No. 647,298

17 Claims. (Cl. 103—1)

The invention relates to liquid pumps of the reciprocating or vibratory type, as distinguished from the more conventional types such as piston, diaphragm, or bellows pumps. Piston pumps are limited by their rather massive constructions to operation at comparatively low frequencies of reciprocation; furthermore, they require sealing rings, which are never truly leakproof, particularly with corrosive liquids. Diaphragm and bellows pumps have smaller moving masses, relatively, and hence may be operated at higher frequencies than piston pumps, but they are somewhat unreliable in service, and their operating lives are short, because the uneven stress distributions which inevitably occur in bellows and diaphragms lead to fatigue failures of these members.

The principal objects of my present invention are to provide a pump for corrosive, toxic, explosive, or otherwise dangerous liquids, which combines the mechanical reliability of piston pumps with the complete freedom from leakage found in bellows and diaphragm pumps; to provide a pump which does not require externally driven impellers or the like moving parts and which is capable of handling a liquid containing solid particles; and to provide a pump the output of which may be readily varied without using control valves or the like.

In accordance with the present invention I provide what may be called a "piston-tube," which is essentially a long, straight, relatively rigid metal tube having a comparatively thin wall, and this tube is filled either with the liquid to be pumped or a propellant liquid separated from the liquid to be pumped by a flexible diaphragm. One end of the piston-tube is open and is rigidly attached to a support while its other end is closed and is subjected to a symmetrical longitudinal vibration, thus causing a relative displacement of the moving end with respect to the fixed end. This displacement between the ends is achieved by elastically stretching and compressing the wall of the tube in the axial direction, the accompanying strain being held within a limiting value such that the amplitude of the resultant mechanical stress is well below the endurance limit of the metal from which the tube is made. The total permissible displacement of the end of a tube thus extended and compressed increases in proportion to the length of the tube, according to Hooke's law of elastic bodies. The total required displacement is proportional to the external liquid-flow rate, and inversely proportional to the number of upward displacements of the closed tube end per unit of time; it is also inversely proportional to the internal cross-sectional area of the piston-tube. Thus, if the frequency of vibration, the internal cross-section, and the length of the piston-tube are sufficiently large, virtually any desired flow rate can be obtained without over stressing, and consequent fatigue failure, of the tube wall.

If the piston tube is supported in vertical position by a combined mechanical support and leakproof hydraulic connector to a closed chamber containing at least one intake valve and one discharge valve, with the intake valve admitting liquid from an external feeder pipe on the downstroke of the tube end, while the discharge valve permits outward flow on the following upstroke of the tube end, then a pulsating, unidirectional external flow of liquid results. If three identical piston-tube-and-valve assemblies are connected to a common intake pipe and a common discharge pipe, then a substantially smooth external flow occurs, provided that the cyclic displacements of the tube ends are one-third cycle out of time-phase with one another. Although a greater number of phases may be employed, the added cost and size are not justified by the additional flow-smoothing obtained thereby, but if it is imperative to provide a flow free from slight pulsations, then a smoothing device such as shown in my copending application, Serial No. 578,777, filed April 17, 1956, may be employed.

In order to operate satisfactorily, the valves in such a pump as described above should be of the type disclosed in my copending application Serial No. 636,597, filed January 28, 1957, because the frequencies needed for successful operation of this pump are at least 20, and preferably in the range of 40 to 500 cycles per second, and conventional check valves will not operate properly above frequencies of about 20 cycles per second.

Although the tensile or compressive stress in the wall of the piston-tube does not exceed the endurance limit, the total force required to produce this stretching and shortening of the tube may amount to many thousands of pounds. Such forces are not readily obtainable from conventional driving mechanisms, such as cams, crossheads and connecting rods, etc., unless these mechanisms are large and massive. Size and massive construction, in driving mechanisms which convert rotary to reciprocating motion, prohibit operation much beyond 20 cycles per second. Hence the preferred prime mover for my invention is an electrodynamic vibration motor, such as shown in my copending application Serial No. 553,015, filed December 14, 1955. In order to reduce the force requirement on this motor, the closed moving end of the piston tube should be attached to a metal mass such that the undamped natural frequency of axial vibration of this mass against the compressive and tensile stiffness of the tube is equal or nearly equal to the frequency of operation of the device. Suitable adjustment of the added external mass must be made to allow for the internal mass of liquid, and of the tube itself, which also move with the external mass. Of course, the design of the upper pipes and supports for the open end of the piston tube must be such that these members do not resonate at or near the operating frequency.

Referring to the accompanying drawings—

Fig. 1 is a front view of a 3-phase embodiment of a piston-tube pump;

Fig. 2 is a sectional view substantially along the line 2—2 of Fig. 1;

Fig. 3 is a detailed view of the valves and valve plate of Fig. 2;

Fig. 4 is an axial section through a piston-tube having a flexible diaphragm separating the propellant liquid from the liquid to be pumped; and Fig. 5 is a sectional view along a diametric plane of an alternative embodiment of a piston tube.

Referring to Figs. 1 to 3, the embodiment shown therein comprises a channel shaped base 1 which supports three sets of uprights or posts 2, each consisting of a group of four vertical posts constituting a part of one of three identical units. The upper ends of each group of posts rigidly support a plate or shelf 4 and secured to the under surface of each shelf is a frusto-conical shaped valve chamber 6, the upper end of which is provided with a closure plate 8 formed with an inlet port 10 and an outlet port 12 (Fig. 2). The inner face of this plate is inclined along the line a—a so that gas bubbles entrained by the liquid being pumped and carried into the valve chamber migrate toward the outlet port, through which they are discharged.

Each of the ports 10 and 12 is provided with a check valve of the type shown in my copending application Serial No. 636,597, filed January 28, 1957, and is here shown as comprising a cantilever-reed or vibratory support 14 screwed or otherwise suitably secured at one end to the closure plate and its opposite end is formed with a hemispherical protuberance 15 which seats on the marginal portion surrounding the port. Each check valve is disposed on the downstream side of the port with which it is associated and hence the check for the intake port is secured to the underside of the closure plate, while that for the outlet port is secured to the upper face of the plate, as shown in Figs. 2 and 3. For reasons above noted and hereinafter more fully explained, the undamped natural frequency of each reed support 14 is approximately three times the frequency of the velocity variation of the propellant fluid.

Each shelf is formed with passages registering with the inlet and outlet ports of the closure plate and mounted on these shelves are intake and discharge ducts or headers 16 and 18, the duct 16 having openings 20 communicating with the intake port 10 of each valve chamber and the duct 18 having corresponding openings 22 communicating with the outlet ports 12. The duct 16 is also provided with a flanged inlet 24 adapted to be connected with an external liquid supply (not shown) and the duct 18 is likewise provided with a flanged outlet 26 adapted to be connected with a transmission pipe or line (not shown). The intake duct 16 is provided at each end with bleeder plugs 27 (Fig. 1) which not only permit priming, but also the escape of entrapped air.

The lower end of each valve chamber is formed with a cylindrical flange 28 which is welded or otherwise rigidly secured to the open upper end of a thin wall cylindrical piston tube 30, preferably made of stainless steel or the like metal which provides a rigid wall capable of undergoing a slight elongation and contraction in response to alternating tension and compression forces applied to its opposite ends. The closed lower end of each piston tube is welded or otherwise rigidly secured to a cylindrical metal mass 32 and each mass is so chosen that the undamped natural frequency of this mass and the mass of the tube and internal liquid, reacting with the axial stiffness of the tube, is equal to or nearly equal to the operating frequency.

Attached to the base channel 1 by means of throughbolts 36 are three identical cylindrical magnetic field structures 38, each comprising a circular mild-steel base plate 40 to which is bolted a concentric cylindrical or conical permanent magnet 42 (Fig. 2), bolted in turn to a cylindrical inner-pole piece 44 of mild steel. Concentric with each base plate 40 is a cylindrical, mild-steel ring 46 mating with a circular, mild-steel outer-pole plate 48 which is concentric with the inner-pole-piece 44, the plate 48 being formed with a circular opening concentric with the inner pole piece 44. Between the polepiece 44 and outer-pole plate 48 is an annular air gap having a radially directed magnetic field of constant intensity, produced by the permanent magnet 42.

Bolted or otherwise rigidly secured to the underside of each mass 32 and concentric with the piston-tube 30 is a solenoidal armature coil 50 having a construction similar to that of the electrodynamic vibrator shown in Fig. 2 of my copending application Serial No. 553,015, filed December 14, 1955. The lower part of each armature projects through the opening in the associated plate 48 (Fig. 2) so as to surround the inner pole-piece 44 and the windings of the three armature coils are connected, respectively, to the three phases of a suitable source of a three phase alternating electric current (not shown). Hence, the forces produced by the three armature coils due to the interaction of their electric currents with the radial magnetic fields are one-third cycle out of time-phase with one another, and so are the resultant alternating vertical velocities of the ends of the three piston-tubes.

If the natural frequency of each piston-tube and its end mass, for lateral vibration, is sufficiently different from the driving frequency of the armature currents, no other suspension for the tube assemblies is needed. However, if necessary, elastic flexure systems may be attached to the three masses 32, so that their freedom of vertical motion is not impaired, but their freedom of lateral motion is greatly restricted.

In operation, the pump behaves as follows: assuming that the system has been properly primed with a liquid to be pumped and that the current has been turned on, the lower end of the first piston-tube is moved downwardly with maximum velocity, whereupon its associated intake valve will be open, permitting inward liquid flow through port 10 from intake header 16. At the same time, the discharge valve is closed, prohibiting outflow of the liquid from the valve chamber 6. The entire inflow is therefore absorbed by the elongation of the piston-tube 30. Simultaneously, each of the other tubes has one-half the maximum velocity in the upward direction, so that the associated discharge valves open, allowing outflow of liquid from the valve chambers into the discharge header 18. The sum of the discharges from the second and third tubes is numerically equal to the rate of inflow to the first tube at this instant, so that, in effect, there is a liquid-flow rate of this magnitude from the intake header 16 to the discharge header 18. The force necessary in each of the second and third tubes to eject the liquid against the pressure in the discharge header is supplied by their respective armature coils.

Conversely, one-half cycle later, when the lower end of the first tube is moving upwardly with maximum velocity, then it discharges liquid into the discharge header at maximum flow rate, while each of the other tubes is then taking in liquid from the intake header at half the maximum flow rate.

There is a commutation of maximum flow, either inward or outward, from one tube to another in regular succession at six times the basic frequency of operation, so that the pulsation in the external flow occurs primarily at sextuple frequency. In the commutation from tube to tube, there are three full discharge strokes from the pump per cycle of the alternating current in any armature coil. Hence, for example, if the base frequency is 60 cycles per second, there are $3 \times 60 = 180$ discharge strokes per second. If the external average flow rate were 20 gallons per minute, and each piston-tube were of 4.00-inch outside diameter with a 0.065-inch-thick wall, the required peak-to-peak displacement of the lower end of each tube would be 0.0364-inch, neglecting the comparatively small volume decrease of the inner liquid column under the pressure of the discharge stroke. Under these conditions, a piston-tube with an effective elastic length of 26 inches would have a dynamic stress amplitude of only 20,000 pounds per square inch if the tube were made of stainless steel.

In the system shown in Figs. 1 to 3, the propellant liquid in the tube 30 is or may be the same as the liquid being pumped, but where it is desired to employ a propellant liquid different from the liquid being pumped or where it is desired to prevent the propellant liquid from mixing with the liquid to be pumped, then each piston tube 30 may be provided with a flexible metallic diaphragm 54 which is welded or otherwise secured to the tube at or adjacent to its junction with the flange 28, as shown in Fig. 4. Such a diaphragm is operative throughout a wide range of frequencies, but for the most efficient operation a diaphragm is selected which has a natural frequency of three times the normal operating frequency of the system. Since provision must be made for filling and emptying each tube, one or more bleeder passages provided with closure screws 56 may be formed in the mass 32 and lower end of the tube.

The piston-tubes of my invention are always comparatively short, so that, unlike the tubes of pumping devices of the type disclosed in the Bodine Patents 2,355,618, issued August 15, 1944, 2,444,912, issued July 13, 1948, and 2,553,543, issued May 22, 1951, they contain a rather small total volume of liquid, and they do not depend for their operation upon standing trains of elastic waves of compression and rarefaction in either the liquid column or the tube wall, or both. Furthermore, the tubes of my present invention require no internal check valves.

However, when the discharge pressure becomes high, the volume decrease of the liquid column under this pressure may become inconveniently large, since the bulk modulus of compressibility for most liquids is low by comparison with those for metals. In such circumstances, it is desirable to reduce the total liquid volume inside each piston-tube, without at the same time reducing either the length or the cross-sectional area of the tube. Reduction of the liquid volume causes a proportionate reduction of the volume decrement under pressure, since this volume decrement is equal to the normal liquid volume in the tube divided by the bulk modulus of compressibility of the liquid, times the increase of pressure in the liquid from intake to discharge. The normal liquid volume within the tube may be reduced without affecting the dimensions of the tube, by the means shown in Fig. 5.

Referring to Fig. 5, a straight, circular-section piston-tube 30a, inside and concentric with itself has another similar tube of smaller diameter 58 which is closed at its upper end by a heavy metal plug 60 welded in so as to prevent any liquid from entering the air space inside tube 58. At its lower end, tube 58 is welded to end plate 62 of tube 30a so that no liquid can reach the interior of a tube 58 via this joint. Between the inner surface of tube 30a and the outer surface of tube 58, there is a cylindrical space 64 which is filled with propellant liquid during the normal operation of the piston-tube. This space may be made as small in its radial thickness as is necessary to reduce the liquid volume therein to the level at which the volume decrement under pressure becomes tolerable. However, the space between tubes cannot be made so small that there is danger of metal-to-metal contact between tubes 30a and 58.

Should it be desirable, tube 58 can be made solid rather than hollow, but this is not usually economical for the pumping of corrosive liquids, since the tubes must then be made of some corrosion-resistant alloy, such as stainless steel, which is more expensive per unit of mass than the low-carbon steel which can be used for the external lumped masses 32.

While I have shown and described different desired embodiments of the invention, it is to be understood that this disclosure is for the purpose of illustration and various changes and modifications may be made without departing from the spirit and scope of the invention as set forth in the appended claims.

I claim:

1. A liquid pump comprising an elongate piston-tube having a radially non-expansible wall capable of undergoing a slight elongation and contraction in response to alternating tensile and compressive forces applied to its opposite end portions, one end of said tube being open and its opposite end being closed, means supporting said piston tube at its open end, a valve chamber connected with the open end of said tube, said valve chamber having inlet and outlet ports provided with check means operative to permit liquid being pumped to pass into said chamber through the inlet port and out of said chamber through the outlet port, an intake duct connected with said inlet port, a discharge duct connected with said outlet port, and means acting on said closed end for alternately exerting compressive and tensile forces thereon at a frequency between 20 and 300 cycles per second so as to effect an alternating decrease and increase in the internal volume of said piston tube and thereby oscillate a propellant liquid therein.

2. A pump as set forth in claim 1, wherein said check means comprise vibratory supports secured at one end and their opposite ends having protuberances normally seating on the marginal portions about said ports.

3. A pump as set forth in claim 1, wherein the open end of said tube is provided with a flexible diaphragm operative to transmit oscillations of the propellant liquid to liquid in said valve chamber.

4. A pump as set forth in claim 1, wherein an elongate member is rigidly supported within said piston-tube so as to provide an annular enclosure for said propellant liquid.

5. A pump as set forth in claim 1, wherein the closed end of said tube carries a metal mass and said vibrating means comprises an electrodynamic vibrator acting on said mass.

6. A liquid pump comprising a vertically mounted elongate cylindrical piston-tube having a radially non-expansible wall capable of undergoing a slight elongation and contraction in response to alternating tension and compression forces applied to its opposite end portions, the lower end of said tube being closed and its upper end being open, means for supporting said piston tube at its open end, a valve chamber connected with said upper end, said valve chamber having inlet and outlet ports provided with check means operative to permit liquid being pumped to pass into said chamber through the inlet port and out of said chamber through the outlet port, an intake duct connected with said inlet port, a discharge duct connected with said outlet port, and means acting on said closed end for alternately exerting compressive and tensile forces thereon at a frequency between 20 and 300 cycles per second so as to effect an alternating decrease and increase in the internal volume of said piston tube and thereby oscillate propellant fluid therein.

7. A pump as set forth in claim 6, wherein said valve chamber is an inverted, generally frusto-conical shaped housing, the convergent end of which is connected to the upper end of said tube, and the divergent end of said housing having a closure plate in which said inlet and outlet ports are formed.

8. A pump as set forth in claim 7, wherein the check means comprise vibratory supports secured at one end to said closure plate and their other ends are formed with protuberances normally seating on the marginal portions about said supports.

9. A pump as set forth in claim 6, wherein the uppermost part of said valve chamber carries said ports, the outlet port being disposed at an elevation slightly higher than the inlet port so that entrained gas bubbles passing into said chamber migrate toward said outlet port.

10. A pump as set forth in claim 7, wherein the inner wall of said closure plate is upwardly inclined, and the outlet port is disposed at a higher level than the inlet port so that entrained gas bubbles passing into said chamber migrate toward said outlet port.

11. A pump as set forth in claim 6, wherein a cylindrical tube is coaxially disposed within said piston-tube and is rigidly secured at opposite ends so as to provide an annular enclosure for said propellant liquid.

12. A pump as set forth in claim 6, wherein the lower end of said tube carries a metal mass and said vibrating means comprises an electrodynamic vibrator acting on said mass.

13. A pump as set forth in claim 7, wherein the junction of the upper end of said tube with the lower end of said valve chamber is provided with a flexible diaphragm operative to transmit oscillations of the propellant liquid in said tube to the liquid in said valve chamber.

14. A liquid pump comprising a plurality of elongate piston-tubes, each having relatively rigid walls capable of undergoing a slight elongation and contraction in response to alternating tension and compression forces applied to its opposite end portions, one end of each tube being open and its opposite end closed, a valve chamber connected with the open end of each tube, each valve chamber having inlet and outlet ports provided with check means operative to permit liquid being pumped to pass into said chamber through the inlet port and out of said chamber through the outlet port, an intake duct having a connection with each of said inlet ports, a discharge duct having a connection with each of said outlet ports, and means for vibrating each of said tubes axially at a frequency of at least 20 cycles per second in symmetrical time phase relation so as to oscillate propellant liquid in said tubes, where the phase difference between successive tubes is one cycle divided by the number of said tubes.

15. A pump as set forth in claim 14, wherein said vibrating means comprise electrodynamic vibrators acting on the closed ends of said tubes.

16. A liquid pump comprising three elongate piston-tubes, each having relatively rigid walls capable of undergoing a slight elongation and contraction in response to alternating tension and compression forces applied to its opposite end portions, one end of each tube being open and its opposite end closed, a valve chamber connected with the open end of each tube, each valve chamber having inlet and outlet ports provided with check means operative to permit liquid being pumped to pass into said chamber through the inlet port and out of said chamber through the outlet port, an intake duct having a connection with each of said inlet ports, a discharge duct having a connection with each of said outlet ports and means for vibrating each of said tubes axially at a frequency of at least 20 cycles per second with a time phase difference of 120° between successive tubes, so as to oscillate propellant liquids in said tubes.

17. A pump as set forth in claim 16, wherein the tubes are vertically disposed and their lower ends carry metallic masses, and the vibrating means comprises electrodynamic vibrators acting on said masses and operated by a three phase alternating power source.

References Cited in the file of this patent

UNITED STATES PATENTS

| | | |
|---|---|---|
| 237,251 | Conacher | Feb. 1, 1881 |
| 609,088 | Dutton | Aug. 16, 1898 |
| 2,317,166 | Abrams | Apr. 20, 1943 |
| 2,478,207 | Robinson | Aug. 9, 1949 |
| 2,772,862 | Van Suchtelen | Dec. 4, 1956 |